Nov. 27, 1962  E. E. MALLORY ETAL  3,065,503
TIRE CURING PRESS CARCASS LOADER
Filed Oct. 11, 1960  6 Sheets-Sheet 1

INVENTORS
JAMES W. BRUNDAGE & EDWIN E. MALLORY
BY
Oberlin, Maky & Donnelly
ATTORNEYS

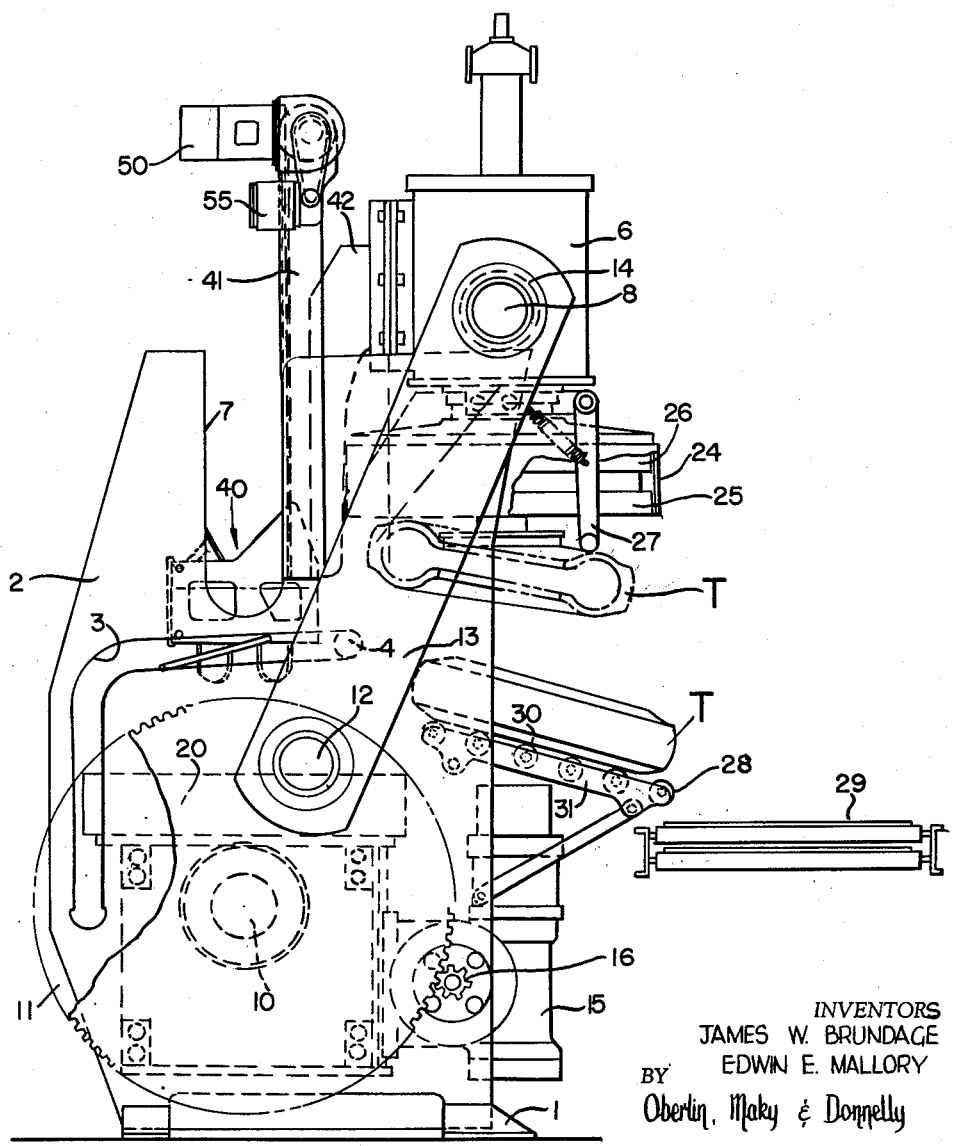

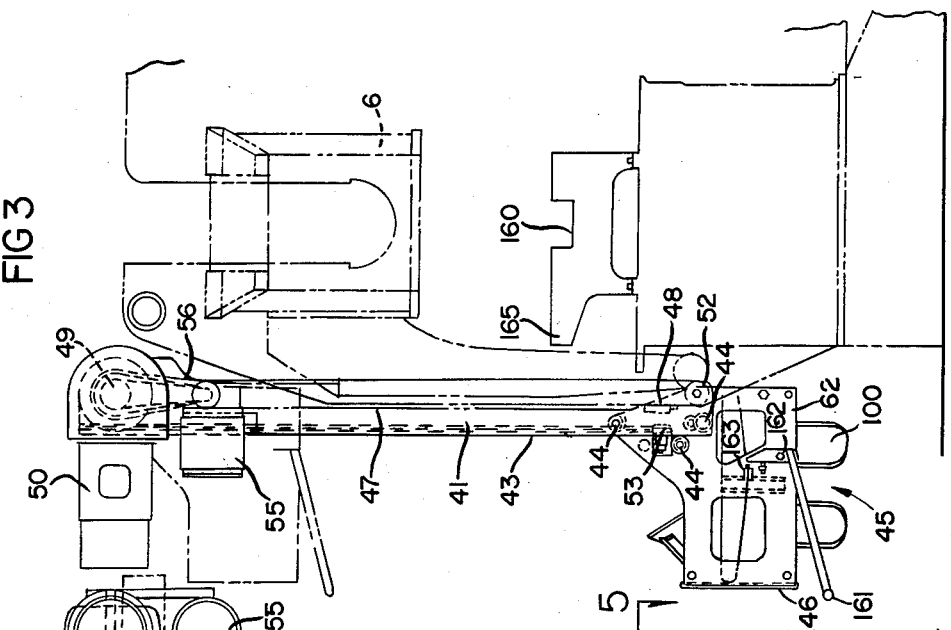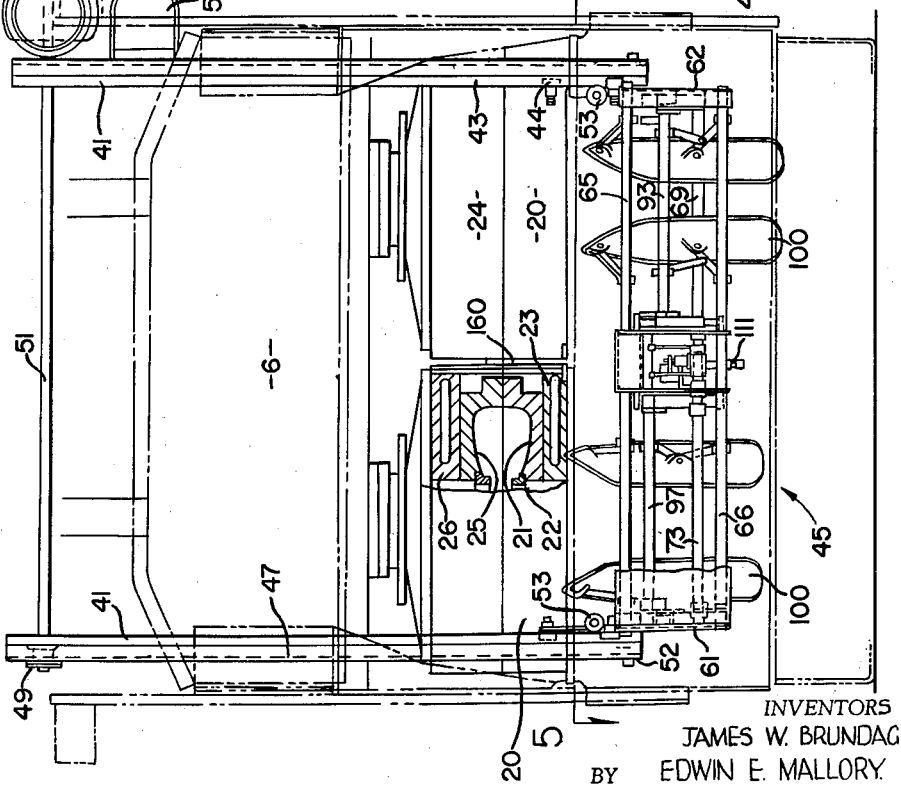

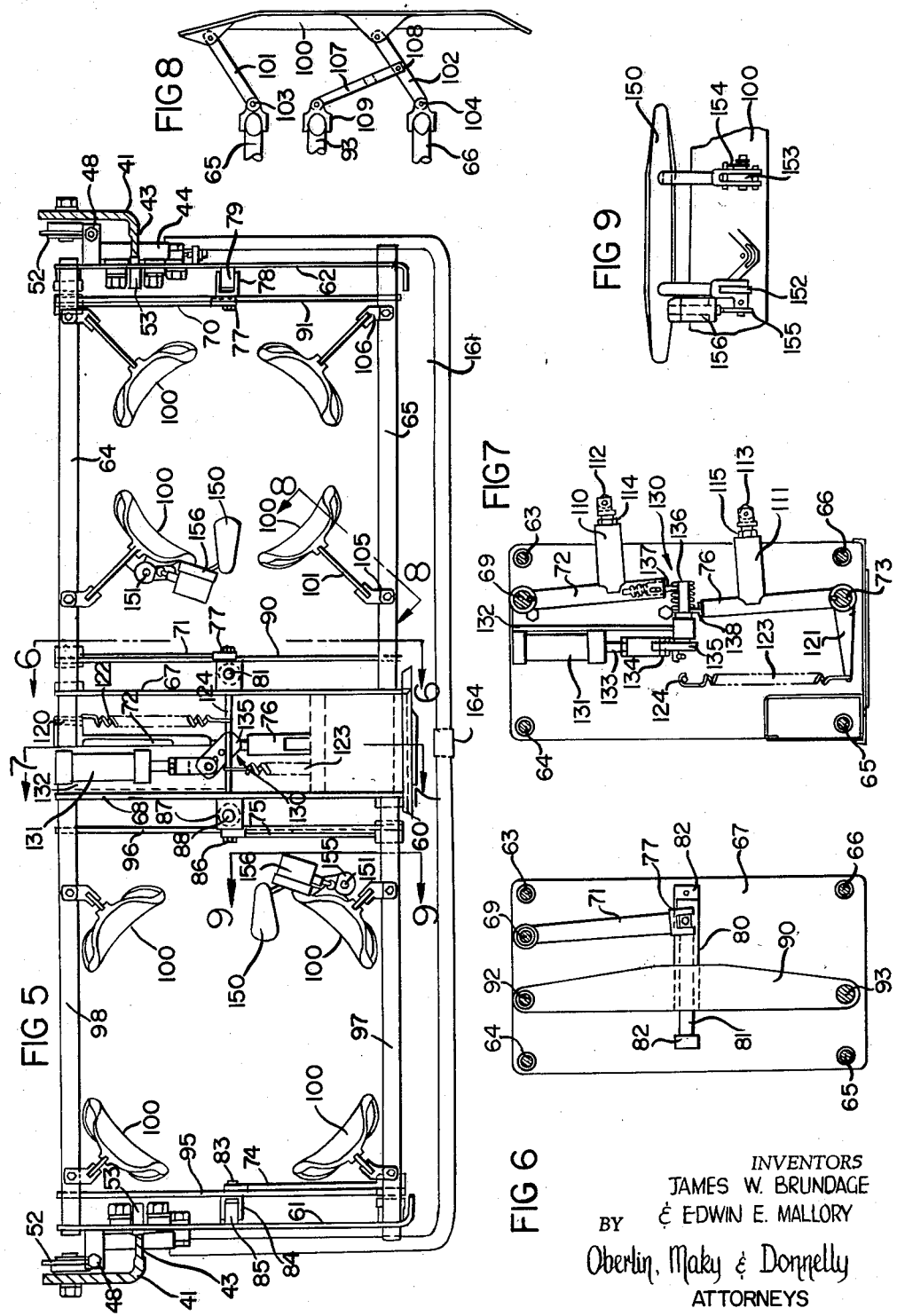

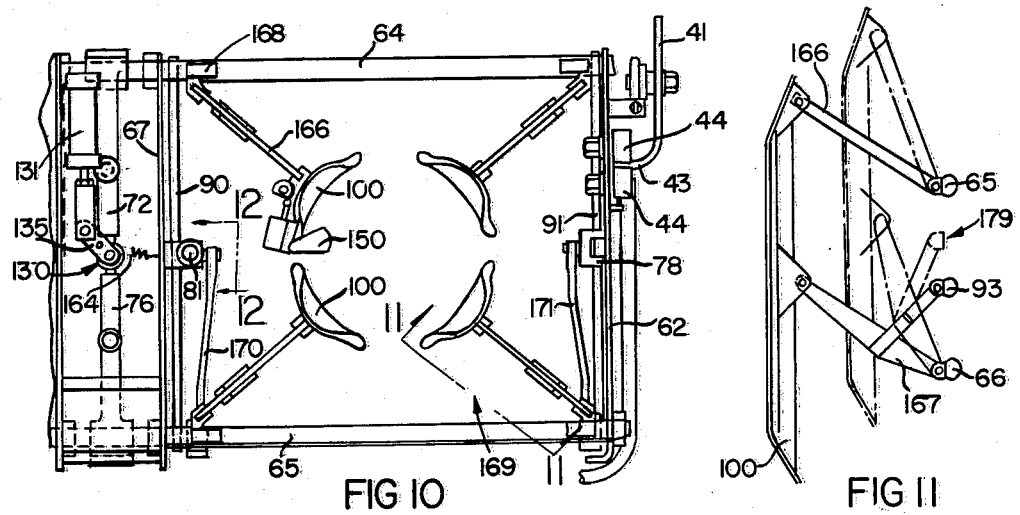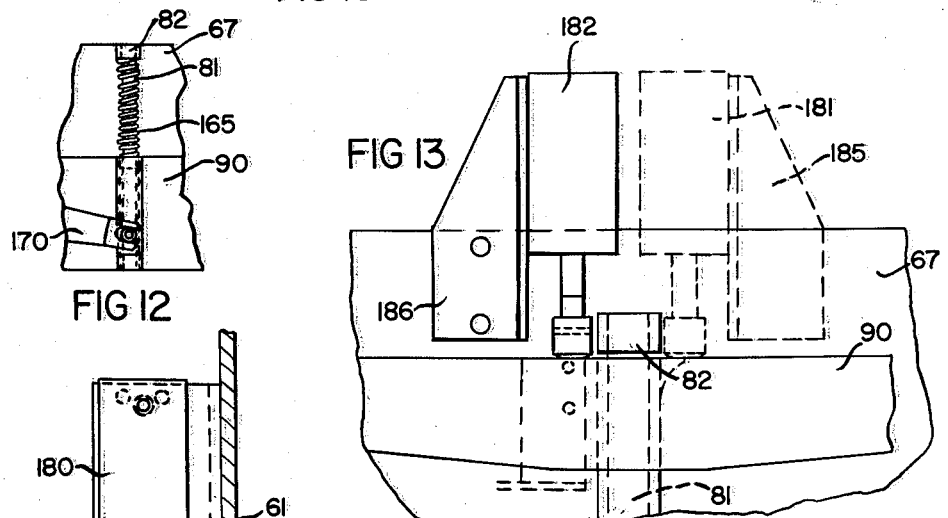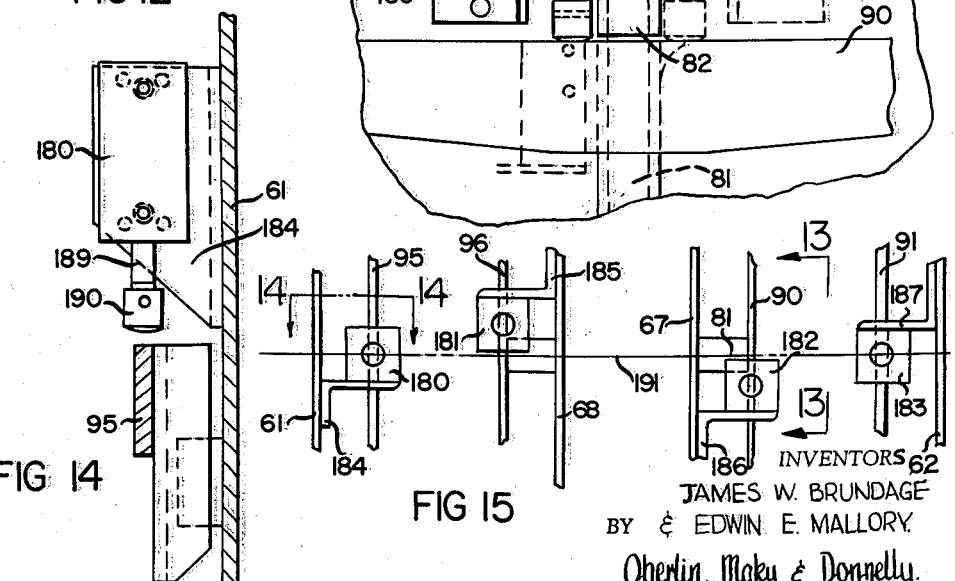

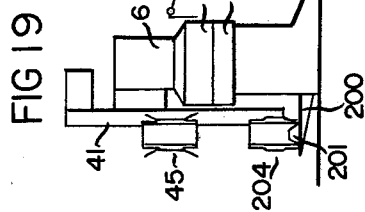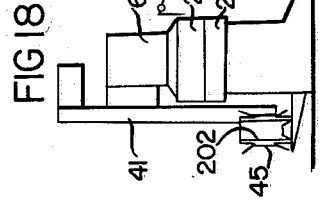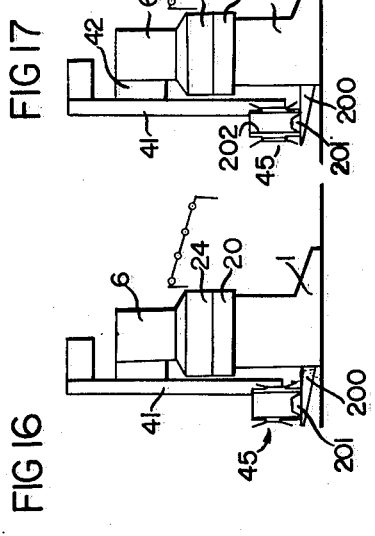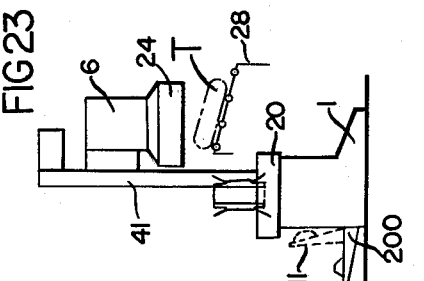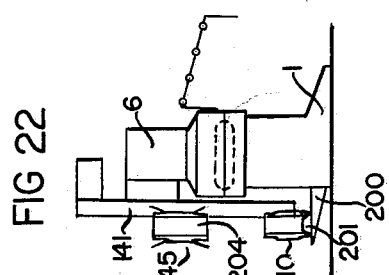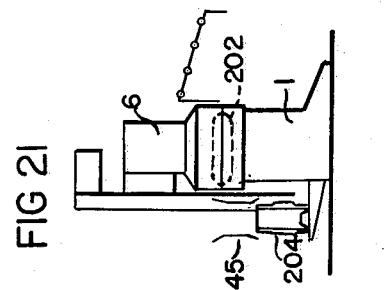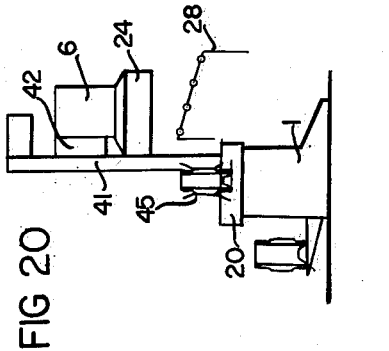
INVENTORS
JAMES W. BRUNDAGE & EDWIN E. MALLORY
BY
Oberlin, Maky & Donnelly
ATTORNEYS

United States Patent Office 3,065,503
Patented Nov. 27, 1962

3,065,503
TIRE CURING PRESS CARCASS LOADER
Edwin E. Mallory, Cuyahoga Falls, and James W. Brundage, Akron, Ohio, assignors to National Rubber Machinery Company, Akron, Ohio, a corporation of Ohio
Filed Oct. 11, 1960, Ser. No. 61,890
9 Claims. (Cl. 18—17)

This invention relates generally, as indicated, to a tire press and more particularly to a tire press having an automatic loader.

It has been conventional practice to design tire curing presses to provide a top vertically movable mold section which, when moved upwardly away from the bottom mold section, enables placement of a green pulley band carcass in upright, centered position on the toe ring of the bottom mold section. Such loading of the press is heavy, fatiguing work and especially so in the case where an upstanding curing bag or diaphragm is employed and over which the carcass must be telescoped. Accordingly, the carcass must be raised considerably above the bottom mold section properly to be placed thereon. Exemplary presses of this type may be seen in the disclosures of the following patents: Brundage Patents Nos. 2,730,763 and 2,778,060 and Frank Patent No. 2,743,480, all assigned to the National Rubber Machinery Company, of Akron, Ohio. In the case of a press employed for curing and shaping a tubeless tire carcass, it has been found that, because the carcass is of a fluid-tight construction, it may be shaped and cured without the use of a curing bag or diaphragm, thus eliminating the problem of telescoping the carcass over the diaphragm.

However, other problems have been found to exist with the press in which no curing bag or diaphragm is used. For instance, the pulley band carcass needs to be set on the bottom mold section for engagement by the top mold section and for reception of the bead-forming mechanism. For a description of a tire curing press disclosing an automatic loader in which the pulley band carcass is set on the bottom mold section for engagement by the top mold section and for reception of the bead-forming mechanism, reference may be had to our copending application, Serial No. 732,531, filed May 2, 1958, entitled "Tire Handling and Curing Press." The present invention represents certain improvements over the unique tire press disclosed therein.

In any event, when the carcass has thus been set on the bottom mold section, the top mold section is moved downwardly to engage and to move the top bead of the carcass downwardly and as the top mold section continues its descent, the carcass is progressively swelled radially or "bellied" approximately to final tire shape by the time the mold sections come together into mating engagement. At that time, curing medium such as hot water or steam is circulated through the interior of the carcass and, of course, the mold sections being mounted on heating platens (or being of such nature that they are steam jacketed or heated by external steam contained in a steam vessel surrounding the mold) are likewise heated whereupon the carcass is expanded and cured in its final tire shape in the mold cavity defined between the mating mold sections.

With the foregoing in mind, it is a principal object of the present invention to provide a tire handling and curing press in which the press may easily be loaded.

It is another principal object of our invention to provide a tire curing press with an automatic loading mechanism which the operator can prepare for loading to avoid delays formerly unavoidable by the simultaneous opening of several presses at a time.

It is another object of this invention to provide a tire handling and curing press having a laterally shiftable head which when the press is opened clears the space above the bottom mold section so that a tire carcass can easily be loaded thereunto from an overhead carcass holder.

It is a still further object of this invention to provide a tire curing press having a carcass loader which will externally grip the green pulley band carcass and which will automatically release the tire in the proper position to set the same on the bead ring of the lower mold section.

It is still a further object of the present invention to provide a tire holding and loading mechanism for a tire press having a green tire carcass holding mechanism of relatively few and easily manufactured parts.

It is also an object of the present invention to provide such tire loading device which may readily be operated in conjunction with the cyclic operation of the tire press.

It is also a further object of this invention to provide a tire curing press and loading mechanism which can readily be adapted to accommodate large size truck tires.

It is still another object of our invention to provide a tire curing press which will have less open time thus decreasing the total cycle time providing a faster cure for tires.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail an illustrative embodiment of the invention, this being indicative, however, of but one of the various ways in which the principle of the invention may be employed.

In said annexed drawings:

FIG. 2 is a side elevational view of the tire curing press and loader on a somewhat enlarged scale with the curing press shown in open position in full lines;

FIG. 3 is a side elevational view of the tire press with the loader shown in carcass receiving position and portions of the press shown in phantom lines;

FIG. 4 is a front elevational view of the press partially broken away as seen from the left in FIG. 3;

FIG. 5 is a fragmentary top plan view of the carcass holder as seen generally from the line 5—5 of FIG. 4;

FIG. 6 is a fragmentary sectional view of the carcass holder mechanism as seen on the line 6—6 of FIG. 5;

FIG. 7 is a view similar to that of FIG. 6 seen on the line 7—7 of FIG. 5;

FIG. 8 is a fragmentary sectional view of the carcass gripping shoe as seen substantially on the line 8—8 of FIG. 5;

FIG. 9 is a fragmentary sectional view of the trigger mechanism and carcass gripping shoe as seen substantially on the line 9—9 of FIG. 5;

FIG. 10 is a fragmentary top plan view of a further embodiment of a carcass holder similar to that of FIG. 5 especially adapted to handle large size or heavy duty truck tire carcasses;

FIG. 11 is a fragmentary sectional view of the carcass gripping shoe of the holder of FIG. 10 as seen substantially on the line 11—11 thereof;

FIG. 12 is a fragmentary detail view of the spring booster mechanism of the holder of FIG. 10 taken substantially on the line 12—12 thereof;

FIG. 13 is a fragmentary elevational view of a further form of carcass holder as seen substantially on the line 13—13 of FIG. 15;

FIG. 14 is a fragmentary sectional view taken substantially on the line 14—14 of FIG. 15;

FIG. 15 is a fragmentary top plan view of the embodiment shown in FIGS. 13 through 15 greatly foreshortened with the tire carcass gripping shoes omitted for clarity of illustration; and FIGS. 16 through 23 inclusve are schematic diagrams of the tire press in the various positions through a complete cycle of operation.

Figure 1:
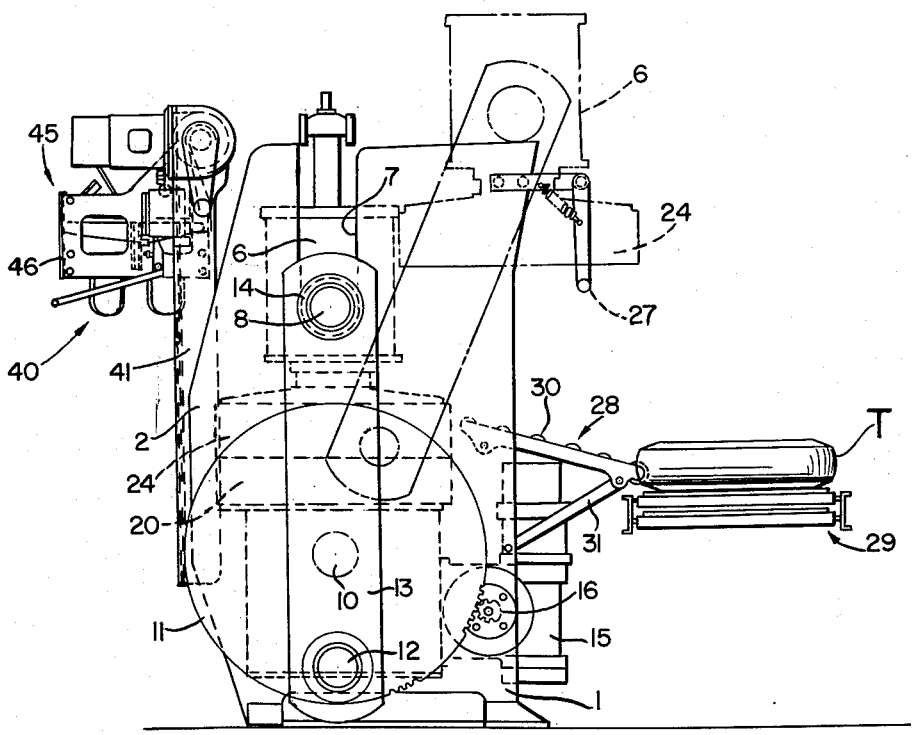
FIG. 1 is a side elevational view of the tire curing press and loader with the curing press being shown in closed position with open position shown in dot-dash lines.

Referring now to the annexed drawings and more particularly to FIGS. 1 through 4 inclusive, the press herein disclosed comprises a base 1 having upstanding cam plates 2 secured to the opposite sides thereof, each of which is formed with a first guide slot 3 for a guide roller 4 on a depending bracket secured to the upper press head 6, such first slot 3 including a vertically extending portion and a generally horizontal portion as shown. With special reference to FIG. 2, it will be seen that cam plate 2 is also formed with a second guide slot 7 including a vertically extending portion and a generally horizontally extending top portion, such top portion having the top of the slot omitted. The guide slot 7 in each plate 2 at the sides of the press accommodates the shafts 8 for movement in a generally L-shape path corresponding to the path of the guide slot 7.

Journalled to each end of the base 1 is a stub shaft 10 of a bull gear crank 11 and pivotally secured to the crank pin 12 thereof is the lower end of a crank link 13, the upper end of such link 13 being pivotally secured on the shaft 8 at the respective ends of the press head 6. As shown, the press head 6 extends between the end plates 2 and preferably each shaft 8 thereof has a guide bushing 14 thereon which has a slide fit in the vertical portion of slot 7.

The bull gear cranks 11 are driven by electric motor driven gear reducers 15, the output shafts of which have pinions 16 in mesh with the teeth of the corresponding bull gear crank. The press is shown in its FIG. 2 position as opened with the crank pins 12 being near the top and the links 13 disposed in a slightly inclined position. The rollers 4 carried by the bracket depending from the press head 6 are disposed adjacent the ends of the horizontal portions of the guide slots 3 and, similarly, the shafts 8 of the press head 6 are disposed adjacent the ends of the horizontal top portions of the guide slots 7.

The base 1 of the press carries a pair of bottom mold sections 20 in side-by-side relationship, as seen perhaps more clearly in FIG. 4, each of which, as well known in the art, is formed with an annular cavity 21 which constitutes the molding surfaces for the bottom bead, the bottom side wall and the lower half of the tread or skid portion of the tire. Each mold section 20 is provided with a toe ring 22 over which the bottom bead of a pulley band carcass is adapted to be positioned, and, of course each mold section has a heating platen 23 thereunder.

The press head 6 likewise carries a pair of side-by-side downwardly facing top mold sections 24 which, like the bottom mold sections 20, define an annular cavity 25 providing the molding surfaces of the top bead, the top side wall, and the upper half of the tread or skid portion of the tire. Again, the heating platen 26 is interposed between each top mold section and the press head.

When the press is in closed position, the top and bottom mold sections 20 and 21 are in mating engagement thereby forming a tire-shape cavity therebetween in which a tire T is adapted to be cured to final shape by a circulation of curing medium such as hot water or steam under pressure through the interior of the tire carcass or through a diaphragm that is in contact within the carcass. When the press is in its closed position as shown in FIGS. 1, 3 and 4, for example, the crank pins 12 will be at the bottom of the bull gears 11 with the links 13 disposed in a generally vertical position. The rollers 4 which are carried by the brackets depending from the press head will be disposed adjacent the bottoms of the vertical portions of the guide slots 3 and similarly the shafts 8 of the press head 6 will be disposed adjacent the bottoms of the vertically disposed portions of the guide slots 7. Thus the bull gear cranks 11 will be rotated in a counter-clockwise direction to position the pins 12 to move the head to its closed position. Each roller 4 and the bracket by which it is attached to the top press head within the corresponding slot 3 will maintain the upper mold section 24 always substantially parallel to the lower mold section 20. To open the press, the bull gear cranks 11 will be rotated in a clockwise direction to move the top mold section and head 6 directly upwardly along the vertical portion of the slot 7 and then backwardly along the top horizontal open portion from the full line position of FIG. 1 to the full line position shown in FIG. 2. As seen, when the press is in its open position, the space above the bottom mold section 20 is obstructed so that a pulley band carcass may easily be positioned from overhead and in upright position around the toe ring 22 of the bottom mold section 20. Also, in the open position, the top mold section 24 is laterally offset from the bottom mold section 20 such that the cured tire T may be dropped therefrom by a convenient stripping mechanism 27 to be placed upon a discharge path defined by a conveyor 28 to be moved rearwardly away from the press. A further conveyor 29 may be employed to carry the tire T from the press itself. The unloading conveyor 28 comprises a downwardly and rearwardly tilted platform carrying anti-friction rollers 30 which may be supported by bars 31 pinned to the respective end plates 2 of the tire press.

The hereinabove described exemplary tire press is similar to that disclosed in the above-mentioned copending application of Brundage et al. and reference may be made to that application for a more complete description of this press.

The particular improvement in this invention is embodied in a press loading mechanism of a simplified nature enabling the press properly to be loaded with a minimum amount of supervision from the operator. In many plants it is not possible to provide a completely automated tire operation since the number of presses employed is not sufficient to warrant the capital investment required for conveyors and other automatic tire carcass handling mechanisms. It therefore becomes a problem to provide an automatic press and loading mechanism which will involve the least amount of supervision and effort by the operator.

The present loading mechanism 40 includes a pair of guide brackets 41 that are secured to the press head 6 adjacent its ends by mounting brackets 42. Each guide 41 is formed with an inwardly directed flange or rail 43 which is engaged by spaced rollers 44, there being two vertically spaced rollers 44 on the back side of rail 43 and a single roller 44 on the forward side as seen more clearly in FIG. 3. This spacing of the rollers assures that the tire carcass receiving mechanism generally shown at 45 on which they are mounted will always be in the proper vertical position with respect to the inturned flange 43 and hence the toe rings 22 of the bottom mold sections 20. The rollers 44 are mounted on a frame 46 which carries the carcass receiving mechanisms and this frame is raised and lowered along the guides by means of cables or chains 47 secured to the ends of the frame at 48 and entrained about sheaves or sprockets 49 at the top of the guides and driven by electric motor 50 through shaft 51 extending between the guides 41. At the lower end of the guide the chains are entrained about sheaves 52 (see FIG. 5) which are journalled in the lower ends of the guides 41.

In addition to the rollers 44, two additional rollers 53 are provided engaging the inner edge of the flange 43 with their axes normal to the axes of the rollers 44. These rollers are shown more clearly in FIGS. 4 and 5 and with the roller arrangement shown, it can readily be seen that the vertical movement of the frame 46 carrying the tire receiving mechanism can closely be controlled such that a carcass within the carcass receiving mechanism may very accurately be placed about the bottom toe rings 22. The rollers 53 will preclude any lateral movement of the loading frame and the rollers 44 will maintain the frame in its proper vertical position.

In addition to driving the sprockets or sheaves 49, the motor 50 is also employed to drive a rotary switch assembly 55 through chain drive 56. This assembly may be employed to control the various functions of the mechanism. Such an assembly obviates the necessity of placing obtrusive limit switches along the guides to halt the loading mechanism in the proper vertical positions. Thus the linear movement of the loading mechanism along the guides 41 can be translated into a rotary movement for the switch assembly 55 thereby aptly to control the proper vertical positioning of the loading mechanism.

Referring now to the carcass receiving assembly 45, which is mounted in the frame 46, which assembly is shown more clearly in FIG. 5, the frame 46 includes a front appearance housing or plate 60 shown as broken away in FIG. 5 and two end plates 61 and 62 on which the rollers 44 and 53 are mounted. The end plates 61 and 62 which are confined to the path of the inturned flanges 43 of the guides 41 are interconnected by four bars 63, 64, 65 and 66 at the respective corners thereof. In addition to the end plates 61 and 62, there are provided further plates 67 and 68 disposed parallel to the plates 61 and 62 and transverse to the bars 63 through 66 inclusive. Thus the frame in addition to the appearance housing is composed of the four transverse plates 61, 68, 67 and 62 and the four elongated support or connecting bars 63 through 66 inclusive at the respective corners of such plates.

Extending between the plates 62 and 67 is an additional pivotally mounted bar 69 which passes through the plate 67 and extends slightly beyond the center of the entire frame. Keyed to this pivotally mounted bar 69 are three arm mechanisms 70, 71 and 72. On the opposite end and side of the frame there is also provided a pivotally mounted bar 73 extending from the end plate 61 through the transverse plate 68 to slightly beyond the center of the entire frame and this bar also has keyed thereto three arms 74, 75 and 76.

The arms 70 and 71 which are keyed to the shaft 69 are each provided with U-shape sliding connections 77 pivotally connecting the distal ends of the arms to vertically reciprocable guide members. The arm 70 is connected to U-shape guide member 78 vertically slidably mounted on guide 79 secured to the inside of end plate 62. The distal end of arm 71 is connected through the pivot connection 77 to tubular slide 80 mounted on cylindrical guide 81 connected by brackets or the like 82 to the outer side of plate 67. Similarly, arm 74 is pivotally connected as at 83 to U-shape slide 84 mounted for vertical reciprocation on guide member 85 connected to the inside of plate 61. The arm 75 is connected through pivot connection 86 to tubular slide 87 mounted on cylindrical guide 88 secured to the outside of plate 68.

Mounted on the tops of the slides 80 and 78 are two identical in form transverse frame members 90 and 91 which are interconnected by bars 92 and 93. On the opposite side of the frame, the slides 84 and 87 mounted on the vertically extending guides 85 and 88 support transverse frame members 95 and 96 interconnected by transverse bars 97 and 98. It will be understood that the bars 97 and 98 extend only between the transverse frame members 95 and 96 and that the bars 92 and 93 extend only between the transverse frame members 90 and 91. The configuration of these transverse frame members is seen more clearly in FIG. 6 and it will now be understood that these transverse frame members support the bars 92, 93, 97 and 98 for vertical movement to control the position of the tire carcass engaging segments or shoes 100 by the link mechanisms seen more clearly in FIG. 8. Four such carcass engaging segments are provided on each side of the frame so that the frame may grip two tire carcasses properly to place the same in the dual press illustrated. It will, of course, be understood that whereas a dual press and loader is illustrated, the invention disclosed herein is equally applicable to a single press or other multi-mold section press. The tire carcass engaging shoe 100 shown in FIG. 8 is connected by a parallelogram linkage comprising parallel links 101 and 102 to the non-movably mounted top and bottom interconnecting bars 65 and 66. Thus the shoe 100 is mounted for swinging movement about the respective pivots 103 and 104 of the links 101 and 102 and yet will always remain in the vertically extending position shown. Pivots 103 and 104 are secured to the transverse bars 65 and 66 by clamps 105 and 106 or the like which may be bolted thereto and support the shoes 100 at an angle to the support bars whereby four shoes with two on each side of the frame will form a generally circular contractible exterior clamp or basket for a tire carcass placed in the center of the right hand side of the frame. In order to control the swinging movement about the pivots 103 and 104, a further link 107 is pivotally connected to the lower link at 108 and pivoted to the intermediate vertically reciprocable bar 93 by clamp 109. It can now be seen that vertical movement of the horizontally extending bars 92 and 93 will cause pivoting of the links 101 and 102 about the respective pivots 103 and 104 to cause the tire carcass engaging shoes 100 to swing inwardly or outwardly. Vertical upward movement of the bar 93 will, of course, swing the links 101 and 102 as shown in FIG. 8 in a counter-clockwise direction to move the tire carcass engaging shoe 100 outwardly and downward movement of the bar 93 will accordingly move it inwardly. On the right hand side of FIG. 5, the tire engaging shoes 100 are shown in their extended tire carcass engaging position and on the left hand side of FIG. 5, they are shown in a retracted position out of engagement with the tire carcass. This relationship is also shown in FIG. 4. With the linkage shown, it is possible to provide an opening ranging from approximately 14 inches in diameter to about 21 inches with the particular loader illustrated.

The tire carcass engaging shoes 100 are of sufficient weight that they will be themselves swing about the pivots 103 and 104 to move into an extended inner position if they are not otherwise restrained. In order to actuate the horizontal bars 92, 93, 97 and 98 for vertical reciprocation, there are provided two downward extensions 110 and 111 on the center arms 72 and 76 keyed to the shafts 69 and 73 respectively (FIG. 7). These downwardly extending arms are provided with contact rollers 112 and 113 respectively, the vertical position of which may be adjusted by manipulation of adjusting nuts 114 and 115. It can now be seen that an upward force on the contact roller 112 will pivot the arm 72 and also the shaft 69 to pivot upwardly the arms 70 and 71 to raise vertically the crossbars 92 and 93 to pivot the parallel links 101 and 102 through link 107 to swing the tire carcass engaging shoes 100 upwardly and outwardly. Similarly, an upward force on contact roller 113 will pivot the arm 76 in a counter-clockwise direction as viewed in FIG. 7 to pivot the shaft 73 to raise transverse frame members 95 and 96 and consequently the crossbars 97 and 98 to pivot the contact shoes 100 on the left hand portion of the frame as viewed in FIG. 5 radially outwardly.

To counterbalance the weight of the shoes 100, each of the arms 72 and 76 is provided with upward extensions 120 and 121 respectively to make in effect the arms and extensions bell cranks keyed to move with the respective shafts 69 and 73. The upper ends of these extensions are connected by springs 122 and 123 to a center bar 124. The tension of these springs 122 and 123 can carefully be selected such that the weight of the shoes 100 will cause the shoes to swing inwardly and downwardly against the tension of these springs automatically to grip a tire carcass positioned in the centers of the two clusters of four carcass gripping shoes. It can now be seen that the tire carcass gripping shoes can be caused to swing outwardly to release the tire carcass by an upward pressure on the contact rollers 112 and 113 and that the tire carcass gripping shoes will swing inwardly and downwardly frictionally to grip a tire carcass by their own weight against the tension of springs 122 and 123.

In order to maintain the tire carcass gripping shoes in their open position after the tire carcass has been released upon the bead rings 22 of the bottom mold sections 20, there is provided a latching mechanism generally shown at 130. This latching mechanism 130 is operated by a piston-cylinder assembly 131 which may be mounted on a support plate 132. The rod 133 of this assembly is provided with a clevis and pivotally mounted as shown at 134 to a lateral crank member or extension 135 of vertically pivotally mounted latch member 136. As shown, this member is provided with vertically extending portions which are vertically notched and also vertically extending portions which are not notched or in effect channeled and these notches engage with spring loaded pawls 137 and 138 on the respective ends of arms 72 and 76. The top edges of the pawls 137 and 138 are beveled such that they may ride over the notches in the latching member 136 such that pressure against the contact rollers 112 and 113 can move the pivot arms 72 and 76 respectively in an upward direction regardless of the position of the latch. However, once in the upper position, as shown by the arm 76 in FIG. 7, actuation of the piston-cylinder assembly 31 is required before the arm 76 can move downwardly to permit the swinging of the tire carcass contacting shoes 100 inwardly to contact and frictionally grip a tire carcass. Thus the arm 72 controlling the shoes on the right of FIG. 5 is shown in its downward position gripping the tire carcass and the arm 76 controlling the shoes on the left of FIG. 5 is shown in its latched upper position whereby the carcass will be released.

In order to insure that a tire carcass will be in position to be gripped by the tire carcass gripping segments 100 before the piston-cylinder assembly 131 releases the latch mechanism 136, there is provided for each of the clusters of four tire gripping segments, a tire carcass contacting trigger shoe 150 mounted on one of the tire contacting segments 100 of each cluster. As shown in more detail in FIG. 9, the trigger shoe 150 is vertically elongated and is mounted for horizontal swinging movement about axis 151 which is provided by two vertically spaced pivots 152 and 153 on the back of the tire carcass contacting shoe 100. At the lower pivot 153, a spring 154 is provided tending to pivot or swing the trigger shoe inwardly toward the center of the cluster or group of tire carcass contacting shoes. A cam plate 155 is mounted for pivotal movement with the shoe 150 at the top pivot 152 which actuates switch 156 when the tire carcass has forced the contacting shoe radially outwardly to swing about the axis 151.

Mounted between the bottom mold sections 20 on the frame of the press, there is provided an upstanding plate 160, the configuration of which is more clearly shown in FIG. 3, which is adapted to contact the rollers 112 and 113 on the arms 110 and 111 respectively to pivot the respective shafts 69 and 73 to release the tire carcass gripped as the loading mechanism is lowered onto the bottom mold sections when the tire press is in the opened position. Thus, as the loading mechanism is brought downwardly onto the top of the open bottom halves of the mold, the tire carcass contacting segments 100 will swing upwardly and outwardly to release the tire carcass after it has been placed or set on the bottom toe rings 22.

As seen in FIGS. 3 and 5, a horizontally extending bar 161 may be pivoted to the side plates 61 and 62 of the carrier or holder as shown at 162 with such bar actuating switch 163. The bar 161 is provided with a centrally disposed contact shoe or wear plate 164 (FIG. 5) to contact the forward extension 165 on plate 160. The switch 163 is thus actuated prior to contact of the top edge of plate 160 with rollers 112 and 113 and the resulting upward pressure thereon. This switch 163 actuates piston-cylinder assembly 131 to rotate latch member 136 to ensure that the contact shoes 100 will be held in their upper outer position after they have been disengaged from the carcass by such upward pressure on rollers 112 and 113. This then constitutes a means to reposition the latch member 136 whereby the notches engage the pawls 137 and 138 to hold the segments 100 clear of the carcass when they are moved radially upwardly and outwardly. When the carrier or holder is back in carcass receiving position and after the switches 156 have both been actuated by the presence of a carcass, the piston-cylinder assembly will again be actuated to release the latch member 136 to allow the shoes gravitationally, frictionally to engage the carcass to be placed onto the bottom mold section when the press opens. Thus, the latch member will be released in the carcass receiving position of the holder and reengaged just prior to the carcass releasing position of the holder on the bottom mold sections.

In the case of heavy duty or extremely large tire carcasses, such as those employed for the production of truck tires, it has been found that a supplement to the gravitational action on the shoes is required properly to grip the carcasses and place them in an upright position on the toe rings of the bottom mold sections of the press. In the embodiment disclosed in FIGS. 10 through 12, springs may be provided to assist the gravitational force on the shoes causing them to swing inwardly and downwardly against the wall of the tire carcass. In the embodiment shown in FIGS. 13 through 15, air cylinders may be employed to supplement the action of the links for applying pressure to the tire carcasses.

Referring first to the embodiment shown in FIGS. 10 through 12, it will be seen that the press head will have mounted thereon guide brackets 41 formed with inwardly directed flanges or rails 43 engaged by rollers 44 mounted on end wall 62 of the carrier. These may be identical in form to the carrier shown in FIG. 5 and such end walls support horizontally extending bars 64 and 65 to form the complete frame. Piston-cylinder assembly 131 actuates latch mechanism 130 permitting downward pivotal movement of arms 72 and 76. These arms permit downward movement of cross frame members 90 and 91 to drop horizontally extending bars 93 to pivot downwardly the tire contacting shoes 100. A trigger shoe mechanism 150 may be mounted on the back of one of such shoes in the same manner as disclosed in FIG. 9. In this embodiment, an over-center spring 164 may be employed secured between the frame member 67 and the crank or link member 135 thus facilitating the positioning of the notched latching portions on the pawl engaging portions of the vertically pivotally mounted latching member. Downward movement of the transverse frame members 90 and 91 moves the horizontal bars 93 downwardly as shown in FIG. 11 inwardly to pivot the shoes 100 to engage the tire carcass. The guides 81 are provided with springs 165 interposed between collar 82 mounted on wall 67 and the top of frame member 90. It is noted that in this embodiment of the carrier, the frame member 90 may be mounted as close to the wall 67 as possible such that the pivotal parallelogram links 166 and 167 may be mounted as shown at 168 close to the corners of the rectangular space 169 defined by the carrier frame. The links 166 and 167 may otherwise be identical in form to the links 101 and 102 as shown in FIG. 8. It will, however, be understood that for heavier tire carcasses, such links may be reinforced as required. Each of the vertically mounted guides for the four transverse frame members on the entire carrier is preferably provided with spring means to assist to boost the gravitational pressure on the transverse frame members to force the tire contacting segments inwardly and downwardly. Thus, the slide 78 will also be provided with a spring to force downwardly the transverse frame member 91. As shown, links 170 and 171 may be offset slightly to facilitate the wider spacing of the links on the frame members 64 and 65 to allow the carrier to accommodate a larger size carcass. As shown in FIG. 10 at 179 in phantom lines, with a four inch vertical travel of member 93, the shoes 100 may move from a twenty eight inch maximum diameter to a fifteen inch minimum diameter. The carrier, itself, of course, will otherwise be identical in form to the carrier more particularly disclosed in FIG. 5.

In FIGS. 13 through 15, an embodiment of the carrier is illustrated wherein air cylinders 180, 181, 182 and 183 may take the place of the springs 165 to force downwardly the transverse members 95, 96, 90 and 91. The cylinders may be mounted on respective brackets 184, 185, 186 and 187 secured respectively to the end wall 61, intermediate walls 68 and 67, and finally end wall 62. As shown more particularly in FIGS. 13 and 14, such air cylinders may include piston rods 189 provided with rounded contact heads 190 adapted to contact and bear against the tops of the respective movable frames 95, 96, 90 and 91. As shown in FIGS. 13 and 15, the air cylinders 181 and 182 are oppositely offset from the centerline of the carrier shown at 191 to clear the collars 82 at the top of guides 81.

It can now readily be seen that with the simple modifications shown in FIGS. 10 through 15, a supplemental mechanical action, i.e., spring, air cylinder or the equivalent may be employed to assist the gravitational action on the pivotally mounted links to enable such links properly to grip heavy duty truck tire carcasses.

It will, of course, be understood that the pressure provided by either the spring or air cylinder embodiments shown may easily be overcome by the upward force of plate 160 on the contact rollers 112 and 113 as the carrier is lowered on the bottom mold sections.

Referring now to the schematic diagrams shown more clearly in FIGS. 16 through 23, the base 1 of the press may be provided with a front platform 200 provided with pilots 201 over which the carcass may be placed to be picked up by the loading mechanism as it is moved downwardly along the guides 41. In FIG. 16, the tire press is shown in its closed position with the carcass loader or carrier and platform 200 empty. In FIG. 17, a first green tire or carcass 202 may be placed inside the carrier 45 on the platform 200 over the pilot 201. This will move the trigger shoes 150 which contact the sides of the carcass outwardly to close switches 156 to enable the piston-cylinder assembly 131 to rotate the latching mechanism 130 to permit the arms 72 and 76 to drop to close the segments on the green tires, as shown in FIG. 18. Moving now to FIG. 19, the carrier then raises the green tires as the holder 45 moves upwardly along the guides 41. Another pair of green tires or carcasses 204 may then be placed on the pilots 201 on the platform 200 as soon as the first pair of carcasses has been lifted to the position shown. Now moving to FIG. 20, the tire press opens to position the top mold section 24 laterally above and offset from the bottom mold section 20 over the conveyor platform 28. As soon as the tire press is opened, the holder 45 will be lowered along the guides 41 to place the green tires or carcasses on the bottom mold sections properly engaging the toe rings 22. The actuation of the loader in response to the opening of the press may be controlled by suitable limit switches. With the carcass in place, the press then closes as shown in FIG. 21 to begin the cure. The closing of the press bellies the carcass to tire shape. When the press is closed, the carrier 45 then returns to the platform 200 to pick up the second pair of carcasses 204 placed thereon. The carrier than raises the second pair of carcasses 204 whereby another pair of carcasses 210 may be placed on the platform 200 over pilots 201 as shown in FIG. 22. Since the curing time of a tire press is approximately 25 minutes, after the carcass 210 has been placed on the pilots, the press will require no further attention of the operator for three cycles or approximately 75 minutes. Thus one operator can handle a great many presses.

Referring now to FIG. 23, at the end of the cure the press opens to strip the pair of cured tires T (formerly carcasses 202) first from the bottom mold sections 20 and then from the top mold sections 24 onto the platform 28. Simultaneously, the holder 45 lowers placing the second pair of carcasses 204 on the lower mold sections 20. The carrier is raised and the tire press closes. The carrier then returns to the platform 200 to be reloaded with the carcasses 210. As shown in FIG. 23, the platform 200 may be pivotally mounted to swing to the position shown at 211 to be out of the way readily to enable the molds to be changed.

It can now be seen that there is provided a tire press having an improved form of tire loading mechanism which will enable the single operator to handle a great many machines and yet will ensure that each tire carcass is properly placed upon the bottom toe ring of a mold section. Moreover, the simple actuating mechanisms for the tire contacting shoes which gravitationally frictionally engage the cylindrical outer walls of the carcass is indeed simplified ensuring the proper operation of the press to enable quick and rapid production of tires.

Other modes of applying the principle of the invention may be employed, change being made as regards the details described, provided the features stated in any of the following claims or the equivalent of such be employed.

We, therefore, particularly point out and distinctly claim as our invention:

1. A carcass loader for a tire curing press of the type having a stationary mold section and a movable mold section arranged for movement away from and then laterally of said stationary mold section, said loader comprising a carcass holder and a vertically extending holder guide adapted to be mounted on such press, means operative to move said holder vertically along said guide to and from a carcass receiving position, means operative to shift laterally said vertically extending holder guide and thus said holder vertically to align said holder with such stationary mold section whereupon further movement of said holder along said guide by said first mentioned means will place such carcass centrally on such stationary mold section preparatory to shaping and curing such carcass when such press is closed, said carcass holder comprising radially inwardly movable segments adapted frictionally to engage the outer wall of such carcass, means urging said segments radially inwardly, link means supporting said segments on said holder for such movement, latch means selectively to preclude such radial inward movement of said segments, and means responsive to the presence of a tire carcass within said segments operative to release said latch means thereby to enable said link means to swing inwardly thus to cause said segments to grip such carcass.

2. A loader as set forth in claim 1 wherein said latch means comprises a rotatable latch member having peripherally spaced vertically extending series of notches, and pawl means operatively interconnected with said segments operative to engage said notches to hold said segments against movement.

3. A loader as set forth in claim 2 including a piston-cylinder assembly operative to rotate said latch member to move said notches clear of said pawl means to release said latch means.

4. A loader as set forth in claim 1 including means responsive to the position of such carcass with respect to such stationary mold section operative to swing said segments outwardly to release such carcass.

5. A loader as set forth in claim 1 wherein said holder includes horizontally extending bars immovable with respect to said holder, said segments being pivoted to said bars for swinging movement, and horizontally extending bars movable with respect to said holder and connected to said segments to swing the same in response to vertical movement thereof.

6. A carcass loader for a tire curing press of the type having a stationary mold section and a movable mold section arranged for movement away from and then laterally of said stationary mold section, said loader comprising a carcass holder and a vertically extending holder guide adapted to be mounted on such press, means operative to move said holder vertically along said guide to and from a carcass receiving position, means operative to shift laterally said vertically extending holder guide and thus said holder vertically to align said holder with such stationary mold section whereupon further movement of said holder along said guide by said first mentioned means will place such carcass centrally on such stationary mold section preparatory to shaping and curing such carcass when such press is closed, said carcass holder comprising radially inwardly movable segments adapted frictionally to engage the outer wall of such carcass, means urging said segments radially inwardly, and means responsive to the position of such carcass in said holder with respect to said stationary mold section operative automatically to elevate said segments moving them radially outwardly to release such carcass on such stationary mold section.

7. A loader as set forth in claim 6 wherein said last mentioned means comprises an upstanding member on such tire press adjacent such stationary mold section adapted to push said segments upwardly and radially outwardly away from such carcass as said holder is moved along said guide to place such carcass on such stationary mold section.

8. A loader as set forth in claim 7 including releasable latch means operable to hold said segments radially outwardly clear of such carcass when thus pushed by said upstanding member on such press.

9. In a tire curing press of the type having a stationary mold section and a movable mold section arranged for movement away from and then laterally of said stationary mold section, a press loader including a tire carcass holder, a vertically extending guide, means mounting said holder on said vertically extending guide, means to shift said guide laterally to align said holder with said stationary mold section when said press is opened, means operative to move said loader along said guide to place such carcass centrally on said stationary mold section preparatory to shaping and curing of such carcass when the press is closed, said carcass holder comprising radially movable segments adapted to swing inwardly and downwardly frictionally to engage the outer wall of such carcass, spring means acting on said segments to assist them in gripping such carcass, and means responsive to the position of such carcass in said holder with respect to said stationary mold section operative to force said segments away from such carcass automatically to release such carcass from said holder onto said stationary mold section.

References Cited in the file of this patent
UNITED STATES PATENTS

| | | |
|---|---|---|
| 1,807,360 | Wehr | May 26, 1931 |
| 2,610,890 | Jaeger | Sept. 16, 1952 |